Patented Oct. 25, 1927.

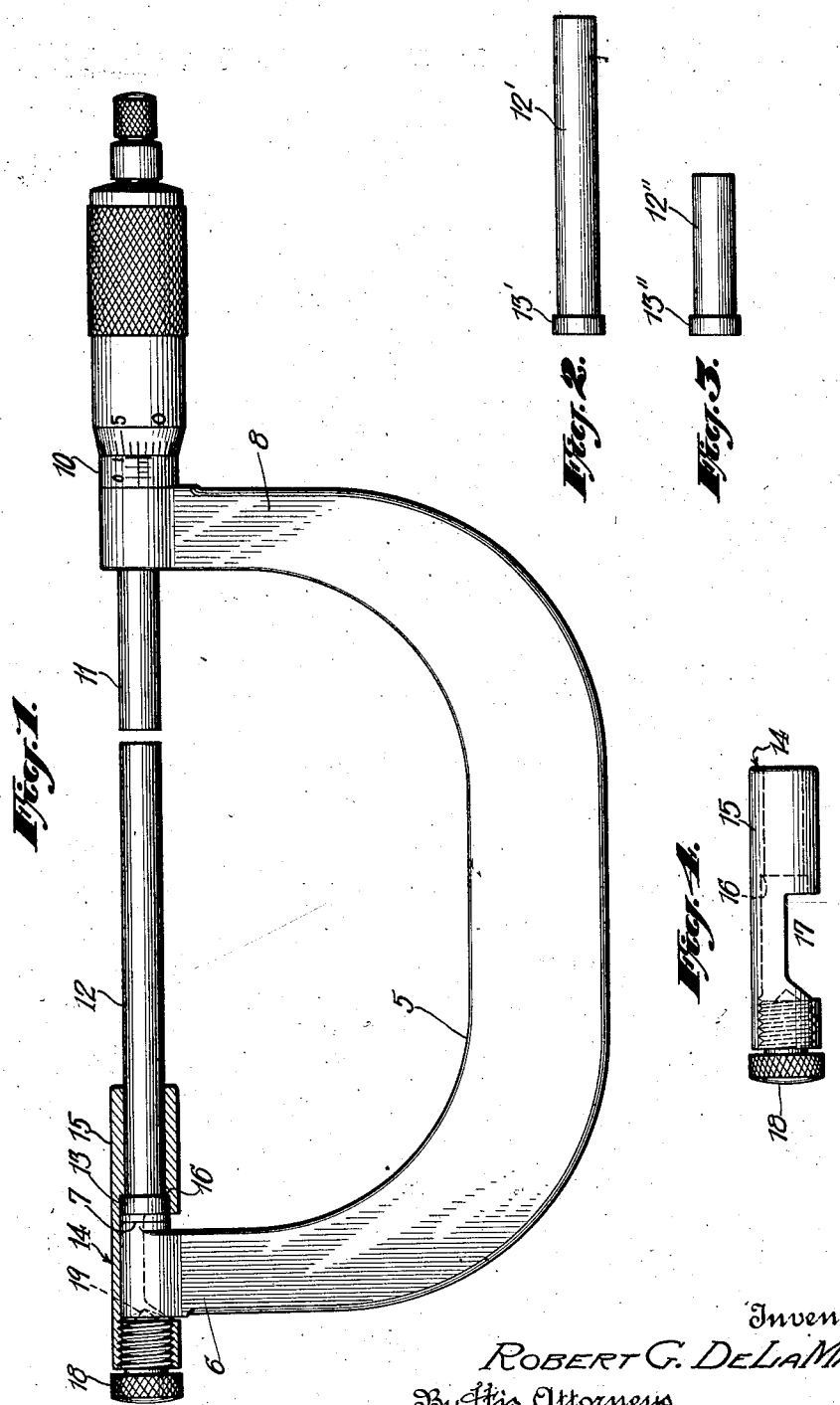

1,646,393

UNITED STATES PATENT OFFICE.

ROBERT GRIFFIN DE LA MATER, OF WORCESTER, MASSACHUSETTS, ASSIGNOR TO REED SMALL TOOL WORKS, OF WORCESTER, MASSACHUSETTS, A CORPORATION OF MASSACHUSETTS.

MICROMETER GAUGE.

Application filed April 6, 1927. Serial No. 181,380.

This invention relates to micrometer gauges of the type comprising a curved two-arm frame, one arm of which is provided with an anvil and the other arm of which is provided with a longitudinally movable micrometer screw mounted in axial alignment with the anvil.

It has been customary to provide micrometer gauges of the above mentioned type in a series of sizes in order to obtain accurate measurements over wide ranges, the necessity for such series being due to the fact that it has been impracticable to provide for extensive longitudinal movement of the micrometer screw in an attempt to increase the range of a given instrument without impairing the accuracy of precision of measurement.

An object of this invention is to provide an improved, simple and reliable means whereby the range of a given instrument may be extended without necessitating undue longitudinal movement of the micrometer screw and without otherwise detracting from the required delicacy and precision in measuring operations.

Other objects and advantages of the invention will become apparent from the following description when taken in connection with the accompanying drawings in which—

Figure 1 is a side elevation of a micrometer gauge with which the attachments embodying this invention are adapted to be used, the extension anvil holder being shown in section and supporting one of a proposed series of extension anvils; Figures 2 and 3 are views showing in elevation additional extension anvils of different lengths, which anvils are interchangeable with each other and with the extension anvil shown in Figure 1; and Figure 4 is a view in elevation of the extension anvil holder shown in Figure 1.

Referring to the drawings, the numeral 5 indicates a curved two-armed frame of a micrometer gauge, one arm 6 being provided with an anvil 7 and the other arm 8 having mounted thereon a micrometer mechanism 10 of any suitable type. The micrometer post or screw 11, of the micrometer mechanism 10, is adapted for only relatively short longitudinal movement toward and away from the anvil 7, the extent of such movement being, for example, one inch for a gauge having a normal maximum limit of four inches, as herein illustrated. That is to say, without the attachment herein shown and hereinafter more particularly described, the maximum distance afforded between the anvil 7 and the outer end of the micrometer screw 11 would be 4 inches and the minimum distance afforded between the anvil 7 and the outer end of the screw 11 would be three inches, assuming that the screw 11 is adapted for maximum movement of one inch either toward or away from the anvil 7. It will therefore be appreciated that any measurement with the so-called four inch gauge herein shown, would, in the absence of the attachments hereinafter more particularly described, be limited to dimensions ranging from three to four inches.

According to this invention the range of measurement is amplified so that in the example given the gauge may be used in measuring dimensions ranging from zero to four inches without increasing the extent of longitudinal movement of the micrometer screw. If, for example, it is desired to measure an object or article ranging in thickness from zero to one inch, an extension anvil 12, shown in Figure 1, is clamped in position on the gauge. This anvil is in the form of a round rod having a diameter substantially equal to the diameter of the screw 11 and provided at one end with a head 13. This anvil 12 is secured to the arm 6 in axial alignment with the screw 11, and the means for effecting such attachment of the anvil 12 to the arm 6 is in the form of an extension-anvil holder 14. This extension anvil holder comprises an anvil-embracing part consisting of a tubular sleeve 15 which is adapted to receive the extension anvil 12 and which is counter-bored in order to provide a shoulder 16 adapted to engage the head 13 of the extension anvil. The sleeve 15 is cut away intermediate its ends, as shown at 17, in order that the outer end of the arm 6 may be received within the sleeve 15, as shown in Figure 1. The anvil holder 14 is clamped in position on the arm 6 by a thumb screw 18, carried by the anvil holder and having threaded engagement with the internally screw-threaded end of the sleeve 15, as shown most clearly in Figure 1. By running the screw 18 down into firm engagement with the arm 6, the shoulder 16 of the sleeve 15 is forced into intimate engagement with the head 13 of the extension anvil 12, whereby such anvil is held in position with its head 13 firmly seated against the flat surface of the anvil 7. In order to insure the extension-anvil holder 14 against accidental displacement, the screw 18 may be provided with a pointed end 19 which is adapted to enter a corresponding recess in the adjacent face or portion of the arm 6, as indicated in Figure 1.

As thus far described the micrometer gauge shown is adapted, with a movement of the micrometer screw of one inch, to measure dimensions ranging from three to four inches and from zero to one inch. By simple substitution of two other extension anvils it may bridge the distance between these extremes. With the extension anvil 12', shown in Figure 2, it may measure dimensions from two to three inches and with the extension anvil 12'', shown in Figure 3, it may measure dimensions from one to two inches. To make this substitution the holder is removed from the head 6, which may be done after slightly unscrewing the thumb screw 18, and the thumb screw is then completely withdrawn from the screw-threaded end of the sleeve 15 and the extension anvil 12 is then withdrawn from the sleeve through such screw-threaded end of the sleeve. Whichever one of the two shorter extension anvils 12' or 12'' it is desired to use may then be introduced into the holder through such screw-threaded end. The screw 18 is then screwed into engagement with the arm 6, and thereby the head of the extension anvil, 13' of the anvil 12' or 13'' of the anvil 13', is forced into intimate engagement with the anvil 7 as previously described in connection with the head 13 of the extension anvil 12.

While extension anvils of only three different lengths are herein shown and described, it will be understood that as many extension anvils, of different lengths may be employed in connection with a given micrometer gauge as are desired without departing from the spirit of the invention or the scope of the subjoined claims.

What is claimed is:

1. In combination, a micrometer gauge having a frame, an extension anvil holder including a sleeve and adapted to be secured to said frame, said sleeve having a shoulder formed thereon, an extension anvil having a head formed thereon, said extension anvil being adapted to be introduced into said sleeve with said head engaging said shoulder, and means for clamping said frame to said holder and clamping said head intermediate said frame and said shoulder whereby said extension anvil is secured against movement with respect to said frame and said holder.

2. For use in connection with a micrometer caliper gauge having a U-shaped frame provided at one end with an anvil and at the other end with a micrometer mechanism, an attachment comprising an extension anvil having a head formed thereon at one end, and an extension anvil holder including a sleeve having an opening therethrough, and a cut-away portion, said opening being at one end threaded and at the other end adapted to receive said extension anvil and being provided with a shoulder with which the head on said extension anvil engages, and a screw in the threaded end of said sleeve adapted to engage that end of the U-shaped frame carrying the anvil for clamping said sleeve to the end of said frame with the end of the head of said extension anvil in engagement with the anvil in said frame.

In testimony whereof, I have affixed my signature to this specification.

ROBERT GRIFFIN DE LA MATER.